United States Patent [19]

Ochiai et al.

[11] Patent Number: 4,535,570
[45] Date of Patent: Aug. 20, 1985

[54] MACHINE FOR BEVELING

[75] Inventors: Nobuo Ochiai, Kawasaki; Takashi Tsumagari, Tokyo, both of Japan

[73] Assignee: Tokyo Shibaura Denki Kabushiki Kaisha, Kawasaki, Japan

[21] Appl. No.: 491,645

[22] Filed: May 4, 1983

[30] Foreign Application Priority Data

May 4, 1982 [JP] Japan .................................. 57-73357
Jul. 1, 1982 [JP] Japan .................................. 57-112561

[51] Int. Cl.³ ............................................. B24B 49/02
[52] U.S. Cl. ............................. 51/165.77; 51/165.72; 51/165.74; 51/165.87; 51/123 R
[58] Field of Search ........... 51/165.77, 165.92, 165.91, 51/58, 165.87, 165.74, 165.72, 123 R

[56] References Cited

U.S. PATENT DOCUMENTS 3,672,100 6/1972 Pesante ............................. 51/165.77
3,905,161 9/1975 Tomita .............................. 51/165.77
3,965,621 6/1976 Grieb ................................ 51/165.87
3,971,168 7/1976 Nishimura ........................ 51/165.87
3,978,624 9/1976 Merkel ............................. 51/165.92
4,363,196 12/1982 Uhtenwoldt .................... 51/165.74
4,376,355 3/1983 Hausermann ................... 51/165.77

FOREIGN PATENT DOCUMENTS 45-39848 12/1970 Japan .

Primary Examiner—Harold D. Whitehead
Attorney, Agent, or Firm—Cushman, Darby & Cushman

[57] ABSTRACT

An apparatus for machining the periphery of a work is provided with a grinding wheel, a holding mechanism for holding the work, and a moving mechanism for moving the holding mechanism toward or away from the wheel. A touch sensor for detecting the contact between a grinding surface of the wheel and a test piece held by the holding mechanism is connected to the wheel and the holding mechanism. The forward or backward movement of the moving mechanism is numerically controlled by a sequence controller using a microcomputer. Data representing the position of the holding mechanism when the touch sensor detects the contact between the grinding surface of the wheel and the test piece is stored in an internal memory of the controller as machining end position data (N1). The memory also prestores machining amount data (N2) and total stroke data (N2+N3). In accordance with the machining end position data (N1), the machining amount data (N2) and the total stroke data (N2+N3), the controller moves the holding mechanism with the work in place of the test piece.

13 Claims, 17 Drawing Figures

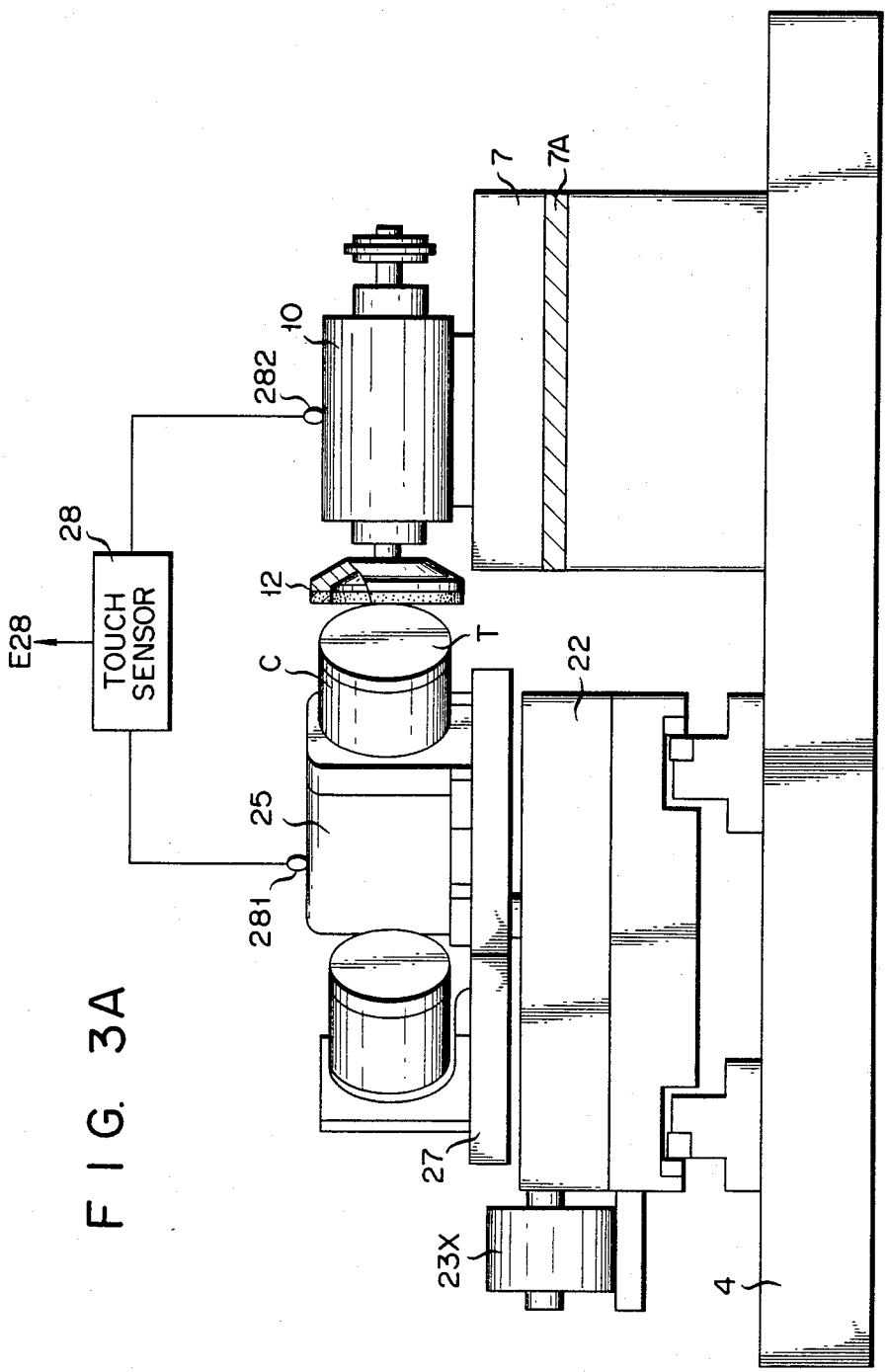

MACHINE FOR BEVELING

BACKGROUND OF THE INVENTION

The present invention relates to a method for machining the periphery of a work such as a thyristor silicon wafer, and to an apparatus using this method.

A technique for obliquely machining the periphery of a wafer of a thyristor is known as one of various methods for improving withstanding voltage of a large-scale semiconductor rectifying element such as a high-power thyristor. Such oblique machining is performed in the following manner. Referring to FIG. 1, a cup-shaped grinding wheel 1 and a silicon wafer 3 mounted on a base plate 2 are prepared. The wheel 1 and the base plate 2 are each rotated, such that the outer periphery of the wafer 3 abuts against the rotating wheel 1. Then, the periphery of the wafer 3 is machined to provide a trapezoidconical silicon wafer.

The sequence for such machining generally consists of 4 steps: (1) the rotating wafer 3 is brought close (in the direction indicated by arrow M1) to the similarly rotating wheel 1 by fast feeding; (2) the wafer 3 is moved by slow feeding (in the direction indicated by arrow M1) so that the wheel 1 gradually cuts into the periphery of the wafer 3; (3) after completion of machining to a predetermined extent, feeding of the wafer 3 is interrupted, and it is kept in this position (this step is called "spark out"); (4) after the spark out step, the wafer 3 is returned by fast feeding to the origin position in the direction indicated by arrow M2.

In order to perform the above sequence, the position of the wafer 3 relative to the wheel 1 must be set for each of the 4 steps. Such positioning may be performed by hardware such as photosensors or microswitches. More specifically, the position of the wafer 3 or of the base plate 2 on which it is carried is detected by a microswitch or the like either before or after each step so as to determine the start or end timing of the step. However, such positioning using hardware significantly degrades the actual machining efficiency. This may be explained as follows. Every time the size of the wafer 3 or the base plate 2 changes, the distance through which the wafer 3 must be fed also changes. Therefore, every time a change in the size of the wafer 3 or the base plate 2 is made, high-precision adjustment of the position of the microswitch (positioning sensor) must be performed.

A chuck of a tool which holds a work (e.g., a silicon wafer mounted on the base plate) is inclined with respect to the machining surface through, for example, 60°. For this reason, it is difficult to precisely determine the machining start and end positions of the work. This means that precise positioning of the positioning sensor is time-consuming. This difficulty or imprecision in positioning the positioning sensor results in significant error or a variation in the amount of machining executed by the machining surface of the wheel. In addition, the machining surface of the wheel is subject to wear. For this reason, even if a positioning sensor is once positioned with high precision in accordance with the type and size of a work, variations in the machining amount due to the wearing down of the wheel over time cannot be prevented. In order to avoid such variations, the positioning sensor must be precisely repositioned as the wheel is worn.

SUMMARY OF THE INVENTION

It is accordingly an object of the present invention to provide an apparatus for machining the periphery of a work, which is capable of guaranteeing accurate machining in accordance with a change in size of the work and with the degree of wear of a grinding wheel.

In order to achieve the above object, the apparatus according to the present invention comprises a device for:

(1) mounting a test piece already having a standard bevel, which standard bevel is to be formed by a predetermined machining, on a holding mechanism which is at a provisional origin position;

(2) moving the holding mechanism toward a grinding wheel or vice versa so as to determine the position (machining end position) of the holding mechanism at the time when the bevel of the test piece contacts a machining surface of the wheel;

(3) withdrawing the holding mechanism to a position (machining start position) at a predetermined distance (corresponding to a predetermined machining amount) from the wheel, and thereafter withdrawing the holding mechanism for a further distance corresponding to a predetermined feed amount (after completion of this step, the holding mechanism is at a so-called normal origin or zero position);

(4) removing the test piece from the holding mechanism and mounting a nonmachined work thereon;

(5) relatively moving the holding mechanism toward the wheel for a distance corresponding to the predetermined feed amount (after completion of this step, the periphery of the work is at a position immediately adjacent to the machining surface of the wheel, that is, the machining start position);

(6) relatively moving the holding mechanism toward the wheel for a distance corresponding to the predetermined machining amount (after completion of this step, a bevel which is identical to the standard bevel of the test piece is formed at the periphery of the work);

(7) relatively withdrawing the holding mechanism to the position of the origin (zero position); and (8) removing the beveled work from the holding mechanism and mounting another nonmachined work thereon.

The above is a summary of the apparatus for machining the periphery of a work according to the present invention. Relative movement or withdrawal mentioned therein means that when the relative distance between the holding mechanism and the wheel is to be changed, either of them can be moved.

Among the steps described above, the position of the origin, the machining start position and the machining end position are determined in steps (1) to (3) according to the actual size of the work in consideration of the wear of machining surface of the wheel. Among such data, the data of the machining end position is obtained with a test piece having a size equal to a target size after machining, and is therefore strictly precise. Thus, if the machining start position data and the origin position data are determined with reference to the machining end position data, extremely precise data without variations may be obtained. Forward and backward feeding of the holding mechanism may then be controlled by a computer or the like in accordance with the three position data obtained. Then, peripheral bevel machining may be realized with almost no error or variation. If the working efficiency is not critical, correct bevel machining may also be performed manually in accordance with the three position data. If the machining end position data is corrected by repeating steps (1) to (3) using a test piece at a suitable frequency, variation in the machining amount due to wear of the wheel may be reduced to a minimum. Data correction based on steps (1) to (3) above is easier and more accurate than conventional readjustment using a positioning sensor.

When an error in the size of a work after machining compared with the standard size of the test piece is found due to wear of the wheel or the like, the machining end position data or origin position data may be corrected at the software level in accordance with such an error. Then, such an error may be readily eliminated. In this case, data correction based on steps (1) to (3) may not be performed.

An apparatus for machining the periphery of a work according to the present invention has means for obtaining machining end position data based on steps (1) to (3) above and for determining machining start position data and origin position data of the work in accordance with the machining end position data; and means for numerically controlling forward/backward feeding of the work in accordance with the three position data. More specifically, the apparatus has a digital sequence controller such as a microcomputer, and a movable holding mechanism for the work which is numerically controlled by the controller.

The machining end position in step (2) may be determined by generating an electrical pulse when the standard bevel of the test piece contacts the machining surface of the wheel. A count or content N1 of a control position counter in the controller is determined by the electrical pulse. The count N1 is the data representing the machining end position. The machining amount required to form a predetermined bevel on a nonmachined work is known in advance. Data representing the travel distance or feed distance of the holding mechanism which corresponds to such a known machining amount is represented by N2. The distance of travel of the holding mechanism between the origin position and the machining end position in step (3) above is also known. Data corresponding to this known travel distance is represented by total or full stroke data given by N2+N3. Thus, when data N1 is obtained in step (2), then the data N1−N2 and data N1−N2−N3 may be immediately determined. The data N1−N2−N3 represents the origin position in step (3). The data N1−N2 represents the machining start position in step (5).

Forward/backward movement of the holding mechanism is numerically controlled in accordance with the data N1, N1−N2, and N1−N2−N3. According to the sequence of numerical control, a nonmachined work is mounted on the holding mechanism at the origin position represented by the data N1−N2−N3 (corresponding to step (4)). When the sequence controller is initiated, the holding mechanism carrying the work is moved to the machining start position represented by the data N1−N2 (corresponding to step (5)). Subsequently, the holding mechanism is moved to the machining end position represented by the data N1 (corresponding to step (6)). Thus, machining of a bevel on the periphery of the work is completed. Thereafter, the holding mechanism carrying the machined work is withdrawn to the origin position represented by the data N1−N2−N3 (corresponding to step (7)). In this manner, on cycle of numerical control for machining a bevel on the periphery of a work is completed.

The apparatus for machining the periphery of a work according to the present invention has an arrangement and operates as described above.

The characteristic features of the present invention are as follows:

(a) the machining end position data N1 as a standard is determined with a standard test piece;

(b) data N2 and N3 (or the total stroke data N2+N3 and the machining amount data N2) which determine the machining start position and origin position, are pre-known and may be freely preset by a software.

Because of the features (a) and (b) above, accurate machining may be guaranteed in accordance with a change in the size of the work and the degree of wear of the wheel. Hardware positioning means, i.e., a positioning sensor, is not required for the basic machining operation of the present invention. For this reason, highly precise adjustment of a positioning sensor, which is required in the prior art technique, need not be performed, while at the same time high machining precision of the work can be guaranteed.

BRIEF DESCRIPTION OF THE DRAWINGS

FIG. 3A is a side view of the apparatus shown in FIG. 3, in which an insulating sheet 7A is placed below a machining table 7 so as to electrically isolate a bearing block 10 from a bearing block 25;

DETAILED DESCRIPTION OF THE PREFERRED EMBODIMENTS

Figure 1:
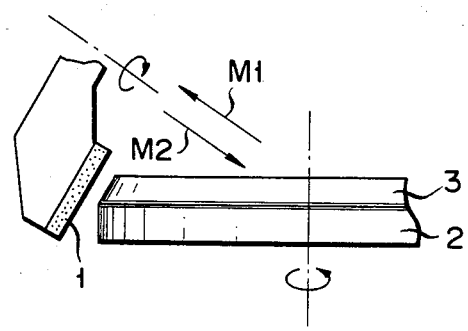
FIG. 1 is a schematic view for explaining the procedure for machining a bevel on the periphery of a silicon wafer according to a conventional method.

The same reference numerals denote the same parts throughout the accompanying drawings, and so, for the sake of brevity, will only be described once.

Figure 2:
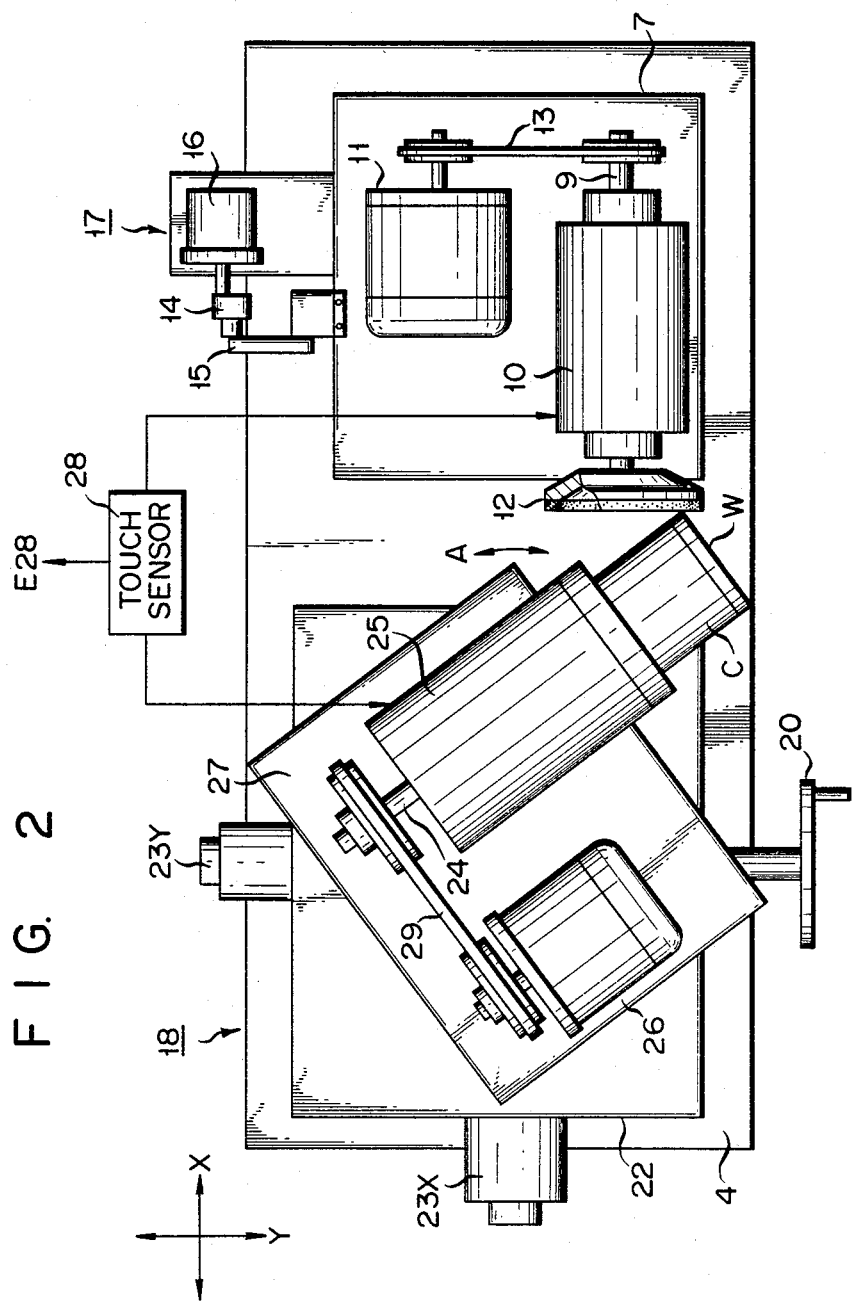
FIG. 2 is a top view of an apparatus for machining the periphery of a work according to an embodiment of the present invention.
Figure 3:
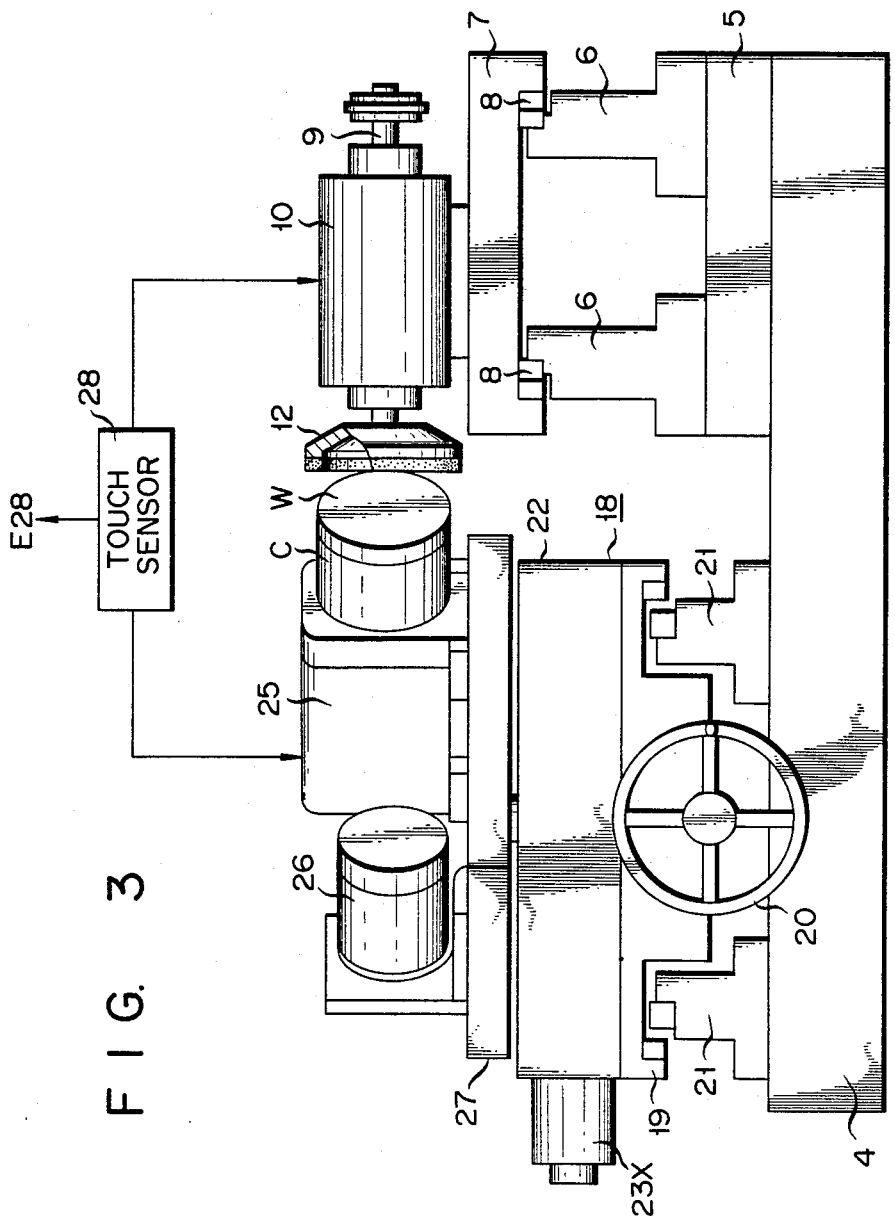
FIG. 3 is a side view of the apparatus shown in FIG. 2.

FIGS. 2 and 3 are a top view and a side view, respectively, of an apparatus for machining the periphery of a work, in accordance with an embodiment of the present invention. A base plate 5 is mounted on the right-hand side of a bed 4, and a pair of guide bodies 6 are arranged on the base plate 5 (FIG. 3). Guide rails 8 extend along the guide bodies 6, and a machining table 7 is supported on the guide rails 8 so as to be reciprocal therealong. A bearing block 10 supporting a spindle 9, and a machining motor 11 for driving the spindle 9 are mounted on the machining table 7 (FIG. 2). A cup-shaped grinding wheel 12 is mounted on the left end of the spindle 9. The wheel 12 has a conductive grinding surface which is obtained by binding diamond abrasive and conductive grains (e.g., nickel powder) with a polyimide resin. Such a conductive wheel is not a specially constructed one but is commercially available. The wheel 12 is driven by the motor 11. The wheel 12 and a belt 13 are surrounded by a safety cover (not shown) for the protection of the operator.

An oscillation mechanism 17 is coupled to the machining table 7 (FIG. 2). The oscillation mechanism 17 comprises an oscillation motor 16 which is coupled to the machining table 7 through a connecting rod 15 and an eccentric joint 14. When the motor 16 is driven, the machining table 7 slowly reciprocates (in the directions indicated by arrow Y). Then, together with the table 7, the wheel 12 being driven is also reciprocated. Due to this reciprocal movement, the entire grinding surface of the wheel 12 is used for machining the periphery of a work W. For this reason, nonuniform wear of the grinding surface of the wheel 12 is prevented, so that the service life of the wheel 12 is prolonged and degradation in the machining precision due to nonuniform wear of the wheel 12 is also prevented. Such nonuniform wear of the wheel 12 may also be prevented even if a Y table 19 (FIG. 3), to be described later, is reciprocated in the directions indicated by arrow Y, instead of the machining table 7 being reciprocated in this direction.

An X-Y table 18 is mounted on the left-hand side of the bed 4 (FIG. 2). The X-Y table 18 consists of the Y table 19 for parallel movement in the direction indicated by arrow Y and an X table 22 for parallel movement in the direction indicated by arrow X (FIG. 3). The Y table 19 is supported on guide rails on guide bodies 21. Movement of the Y table 19 may be performed manually by means of a handle 20 or electrically by a Y-axis drive pulse motor 23Y (FIG. 2). The X table 22 is placed on the Y table 19 through a slide mechanism (not shown). The X table 22 moves on the slide mechanism as driven by an X-axis drive pulse motor 23X.

A machining table 27 is mounted on the X table 22 such that it is pivotal in the directions indicated by arrow A (FIG. 2). A bearing block 25 for supporting a spindle 24 and a work rotating motor 26 for driving the spindle 24 are mounted on the machining table 27. A holding mechanism C having a vacuum suction mechanism is mounted to the right and below the spindle 24 (FIG. 2). The holding mechanism C securely holds by suction a work W, such as a sliced-plate silicon wafer, or a test piece T (FIG. 5) which is equal in size to a target size of such a work W. The left end of the spindle 24 is coupled to the motor 26 through a belt 29. The belt 29 is surrounded by a safety cover (not shown) for safety. The work W held by the holding mechanism C is rotated by the motor 26.

When the periphery of the work W, being rotated by the motor 26, is abutted against the grinding surface of the wheel 12, being rotated by the motor 11, a bevel of a predetermined angle is formed on the periphery of the work W. The angle of the bevel is determined by the angle which is formed by the central axis of the spindle 9 at the side of the machining table 7 and the central axis of the spindle 24 at the side of the machining table 27. In other words, this angle is determined by the angle of rotation of the machining table 27 with respect to the X table 22. Therefore, the angle of the bevel to be formed on the periphery of the work W may be freely changed or modified by pivoting the machining table 27 in the direction indicated by arrow A.

Figure 5:
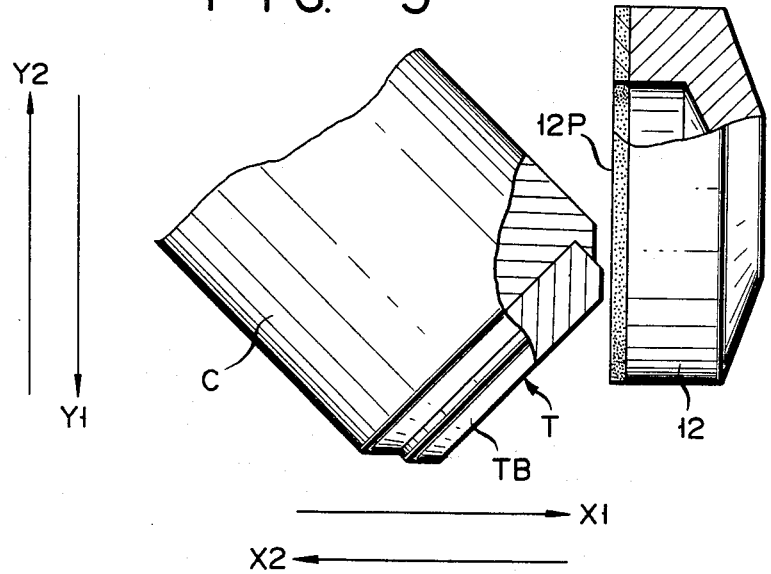
FIG. 5 is a partial view showing the state wherein a test piece T is mounted on a holding mechanism C and the test piece T is brought into contact with a grinding wheel 12.

The bearing block 10 on the machining table 7 is electrically isolated from the bearing block 25 on the machining table 27. Such isolation may be obtained by disconnecting at one point the line connecting the blocks 10 and 25. For example, as shown in FIG. 3A, the blocks 10 and 25 may be isolated by placing an insulating sheet 7A below the table 7. The blocks 10 and 25 are connected to a touch sensor 28. Assume now that a copper test piece T is held by suction on the holding mechanism C, and the pulse motors 23X and 23Y are driven to bring a bevel TB on the periphery of the test piece T close to the wheel 12 (FIG. 5). The test piece T is gradually brought closer to the wheel 12 as the pulse motors 23X and 23Y rotate. When the bevel of the test piece T touches the grinding surface of the wheel 12, the block 25 is electrically connected to the block 10. The touch sensor 28 detects this, and generates a touch signal E28. The position of the X-Y table 18 (particularly, the position of the X table 22) at the time the signal E28 is generated represents the machining end position of the work W.

The data representing the position of the X-Y table 18 or the machining table 27 when the signal E28 is generated is the standard data for numerical control of the pulse motor 23X (or the pulse motors 23X and 23Y) to be described hereinafter.

Numerical control is performed by a digital sequence controller using a microcomputer. Numerical control utilizing such a controller may be roughly divided into two types. In numerical control of the first type, movement of the X table 22 is numerically controlled and the Y table 19 is driven by a general motor or is manually driven. In numerical control of the second type, movement of both the X and Y tables 22 and 19 is numerically controlled. The following description will be made with reference to the case wherein the movement of the X table 22 alone is controlled. For numerically controlling both the X and Y tables 22 and 19, the descriptions in brackets must also be considered.

Figure 4A:
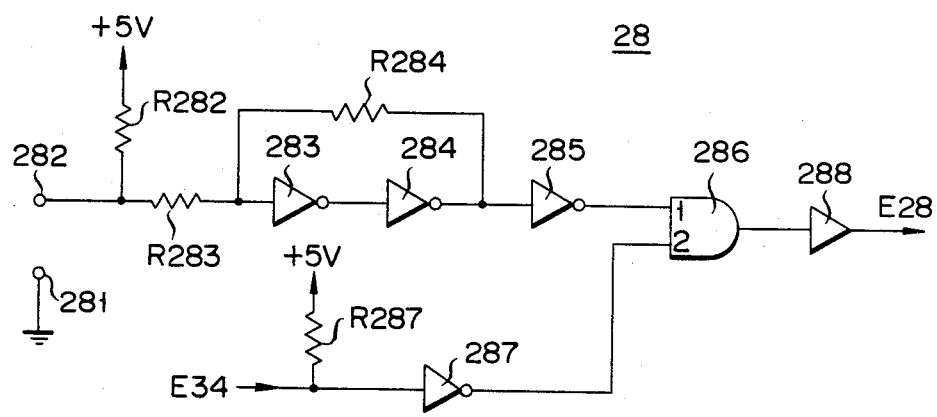
FIG. 4A is a circuit diagram of a touch sensor 28 shown in FIGS. 3A and 4.
Figure 4:
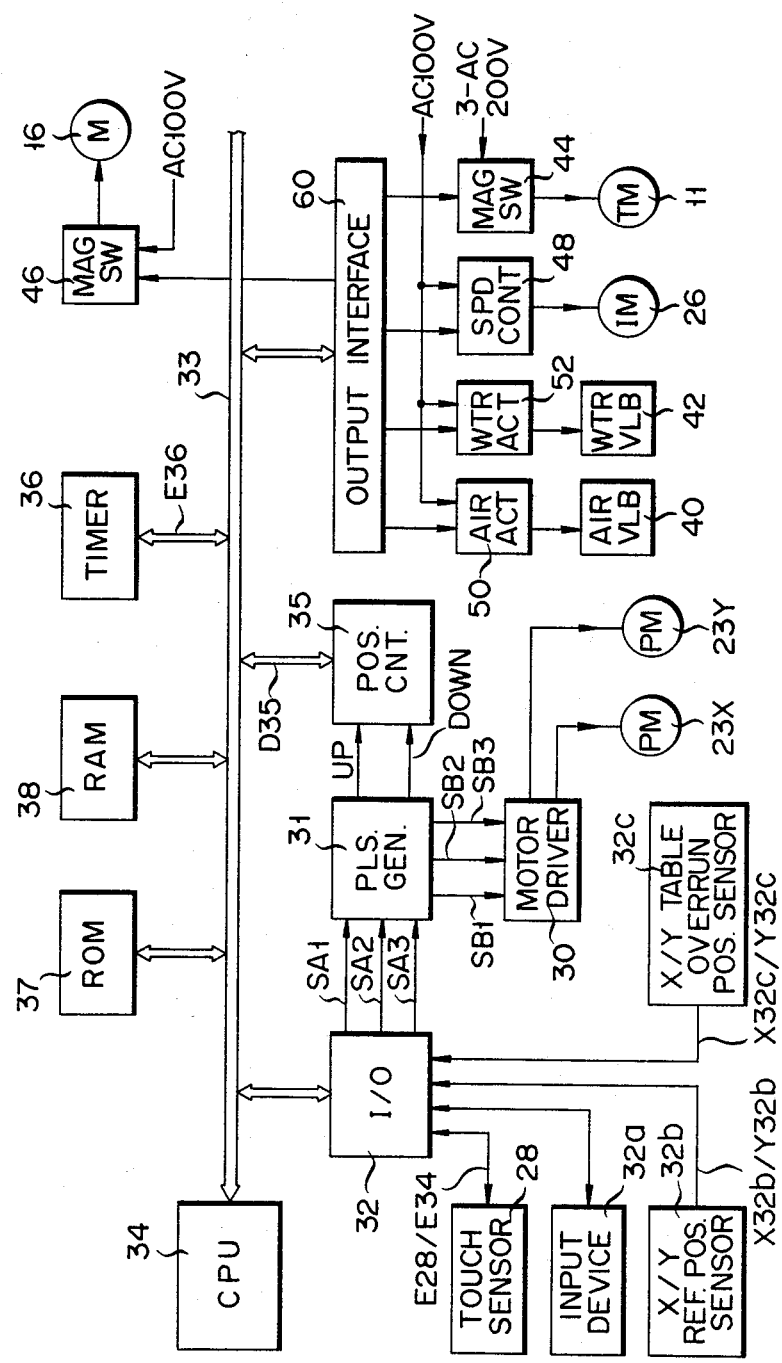
FIG. 4 is a block diagram of a digital sequence controller for numerically controlling the apparatus shown in FIGS. 2 and 3.

FIG. 4 shows a block diagram of a sequence controller for numerically controlling the X table 22. The X-axis drive pulse motor 23X (and Y-axis drive pulse motor 23Y) is/are driven clockwise CW or counterclockwise CCW by a motor driver 30. When the motor 23X (and the motor 23Y) rotates (rotate) in the CW direction, the X table 22 (and the Y table 19) is/are moved toward the wheel 12. On the other hand, when the motor 23X (and the motor 23Y) is/are driven in the CCW direction, the X table 22 (and the Y table 19) is/are withdrawn from the wheel 12. The rotational speed and direction of the motor 23X (and the motor 23Y) are determined in accordance with drive pulses SB supplied to a motor driver 30 from a pulse generator 31. The pulses SB may be CW pulses SB1 for driving the motor 23X (or motor 23Y) rapidly in the CW direction, CW pulses SB2 for driving the motor 23X slowly in the CW direction, or CCW pulses SB3 for driving the motor 23X (and the motor 23Y) rapidly in the CCW direction. Which type of pulse is supplied to the driver 30 is determined by control signals SA1, SA2 and SA3. These control signals SA1, SA2 and SA3 are supplied from a central processing unit (CPU) 34 through an I/O interface 32 and a data bus 33. The CPU 34 may be a microcomputer (model Z-80) available from Zailog Corp. in the U.S.A., or one equivalent thereto.

When the control signal SA1, SA2 or SA3 is supplied to the pulse generator 31, the pulse generator 31 generates the corresponding pulses SB. The position counter 35 up/down counts the pulses SB which are also supplied to the driver 30. Thus, when fast feeding of the X table 22 (or the Y table 19) is instructed by the control signal SA1, the pulse generator 31 generates the CW pulses SB1 having a high frequency. Then, the driver 30 drives the pulse motor 23X (or the pulse motor 23Y) rapidly in the CW direction, and the counter 35 up-counts the CW pulses SB1. When slow feeding of the X table 22 is instructed by the control signal SA2, the pulse generator 31 then generates the CW pulses SB2 having a lower frequency (e.g., 1/16 to 1/128 times that of the pulses SB1). Then, the driver 30 drives the pulse motor 23X slowly in the CW direction, and the counter 35 up-counts the CW pulses SB2. Therefore, the count of the counter 35 provides data which represents the total distance through which the X-Y table 18 has been fed. When fast withdrawal of the X table 22 (and the Y table 19) is/are instructed by the control signal SA3, the pulse generator 31 generates the CCW pulses SB3 of high frequency (e.g., of the same frequency as that of the CW pulses SB1). Then, the driver 30 drives the pulse motor 23X (and the motor 23Y) rapidly in the CCW direction, and the counter 35 down-counts the CCW pulses SB3. Then, the count of the counter 35 represents the overall distance of withdrawal of the X-Y table 18 after forward movement in response to the pulses SB1 and SB2 has been completed.

The count or content of the counter 35, that is, the position data D35 of the X table 22, is supplied to the CPU 34 through the data bus 33. In response to the content indicating that the X table 22 has reached the machining end position to be described later, the CPU 34 triggers a timer 36. After being triggered, the timer 36 generates a timer signal E36 for a predetermined period of time. The signal E36 is supplied to the CPU 34 through the data bus 33. For the predetermined period of time during which the signal E36 is received, the CPU 34 stops generation of all the control signals SA1 to SA3. During such a period, the X table 22 remains stopped (this period corresponds to the spark out period to be described later).

A microprogram or the like for properly operating the CPU 34 is stored in a ROM 37, while a program and other data necessary for numerical control are stored in a RAM 38. The other data necessary for numerical control is obtained from an input device 32a, an X/Y reference position sensor 32b, an X/Y table overrun position sensor 32c, and the touch sensor 28. The content N1 of the counter 35 at a time when the touch sensor 28 generates a touch signal E28 is stored as the machining end position data in the RAM 38 by the CPU 34. Machining amount data N2 and total stroke data N2+N3, which are key-inputted from the input device 32a, are also stored in the RAM 38. In accordance with the numerical control program and the data N1, N2 and N2+N3 stored in the RAM 38, the CPU 34 machines a bevel on the periphery of a work W shown in FIG. 2 or 3. The sensor 32b is for determining the provisional X- and Y-axis origins and comprises a microswitch or photosensor. When the CPU 34 is initialized by the input device 32a, the X table 22 and the Y table 19 are returned. When the X table 22 reaches the provisional origin (provisional X-axis origin), the sensor 32b supplies an X table stop signal X32b to the CPU 34. Then, the X table 22 stops moving. When the Y table 22 reaches the provisional origin (Y axis origin), the sensor 32b supplies a Y table stop signal Y32b to the CPU 34. Then, the Y table 19 also stops moving. When the X table 22 begins to run beyond a predetermined travel range, the sensor 32c supplies an X table stop signal X32c to the CPU 34. When the Y table 19 overruns beyond a predetermined travel range, the sensor 32c supplies a Y table stop signal Y32c to the CPU 34.

Not only the X- and Y-axis drive pulse motors 23X and 23Y, but the CPU 34 controls other devices such as the machining motor 11 (3-phase), the oscillation motor 16 (single-phase), the work rotating motor 26 (induction motor), an air valve 40 for cleaning the work W (or test piece T), and a water valve 42 for aiding machining, and so on. The start/stop of the motors 11 and 16 is controlled by the ON/OFF operation of electromagnetic switches 44 and 46, respectively. The rotational speed of the motor 26 is controlled by a speed controller 48. The valves 40 and 42 are opened/closed by actuators 50 and 52, respectively. The switches 44 and 46, the speed controller 48 and the actuators 50 and 52 are all controlled by the CPU 34 via an output interface 60.

FIG. 4A shows a circuit diagram of the touch sensor 28 shown in FIGS. 3 and 4. The bearing block 25 (or the bed 4 electrically connected to the block 25) is connected to an input terminal 281 at ground potential. The bearing block 10 (or the machining table 7 electrically connected to the block 10) is connected to a hot input terminal 282. The terminal 282 is connected to a +5 V line corresponding to logic level "1" through a resistor R282. The terminal 282 is also connected to the input terminal of an inverter 283 through a resistor R283. The output terminal of the inverter 283 is connected to the input terminal of an inverter 284, the output terminal of which is connected to the input terminal of the inverter 283 through a resistor R284. The inverters 283 and 284 and the resistors R282 to R284 constitute a wave shaper which converts the level change at the terminal 282 to a pulse with a fast rising and falling speed. The output terminal of the inverter 284 is also connected to the first input terminal of an AND gate 286 through an inverter 285. The second input terminal of the AND gate 286 is connected to the output terminal of an inverter 287, the input terminal of which is connected to the +5 V line through a resistor R287. The input terminal of the inverter 287 receives an enable signal E34 of logic level "0" from the CPU 34 during the time period in which contact of the test piece T with the wheel 12 is detected. While the enable signal E34 is at logic level "0", the output signal from the inverter 287 is at logic level "1" to open the AND gate 286. In this case, when the terminals 281 and 282 are short-circuited by the contact of the test piece T with the wheel 12, a pulse of logic level "1" with a fast rising speed is produced from the AND gate 286. This pulse is supplied to the CPU 34 through a buffer 288 as the touch signal E28. The leading edge of the signal E28 informs the contact of the test piece T and the wheel 12 to the CPU 34.

Figure 4B:
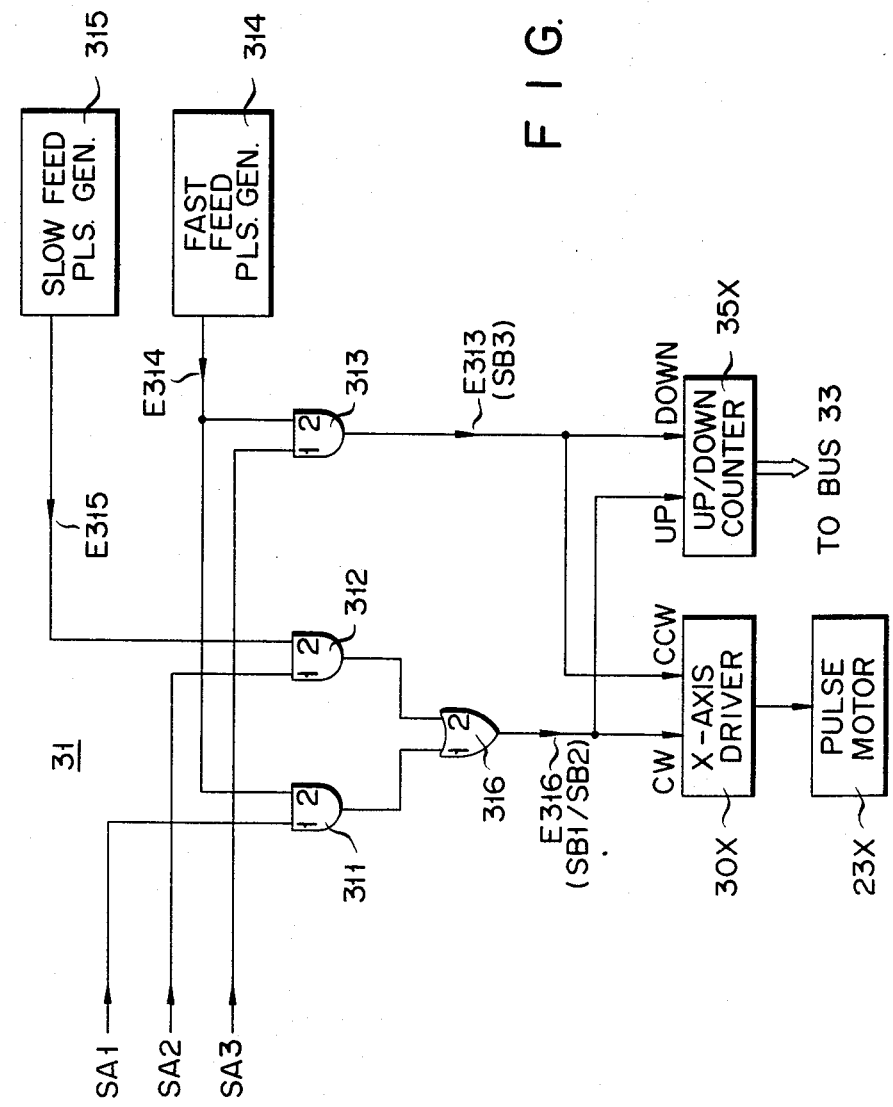
FIG. 4B is a circuit diagram of a pulse generator 31 shown in FIG. 4.

FIG. 4B shows an example of the pulse generator 31 shown in FIG. 4 for X-axis control. The control signals SA1, SA2 and SA3 as described above are respectively supplied to the first input terminals of AND gates 311, 312 and 313, respectively. A fast feed pulse E314 of high frequency from a fast feed pulse generator 314 is supplied to the second input terminals of the first and third AND gates 311 and 313, respectively. A slow feed pulse E315 of low frequency from a slow feed pulse generator 315 is supplied to the second input terminal of the second AND gate 312. The generator 315 may comprise a frequency divider which frequency-divides the fast feed pulse E314 by any rate of, e.g., 16 to 128. Outputs from the AND gates 311 and 312 are supplied to an OR gate 316. An output E316 from the OR gate 316 is supplied to a CW rotation input terminal of an X-axis driver 30X of the motor driver 30 and to the up-count input terminal of an X-axis up/down counter 35X.

When the control signals SA1 and SA2 have logic levels of "1" and "0", respectively, the output E316 becomes the same as the fast feed pulse E314 and is supplied as the CW pulse SB1. When the control signals SA1 and SA2 have logic levels "0" and "1", respectively, the output E316 becomes the same as the slow feed pulse E315 and is supplied as the CW pulse SB2. An output E313 from the AND gate 313 is supplied to the CCW rotation input terminal of the driver 30X and to the down count input terminal of the counter 35X. When the control signal SA3 has a logic level of "1", the output E313 becomes the same as the pulse E314 and is supplied as the CCW pulse SB3.

Figure 4C:
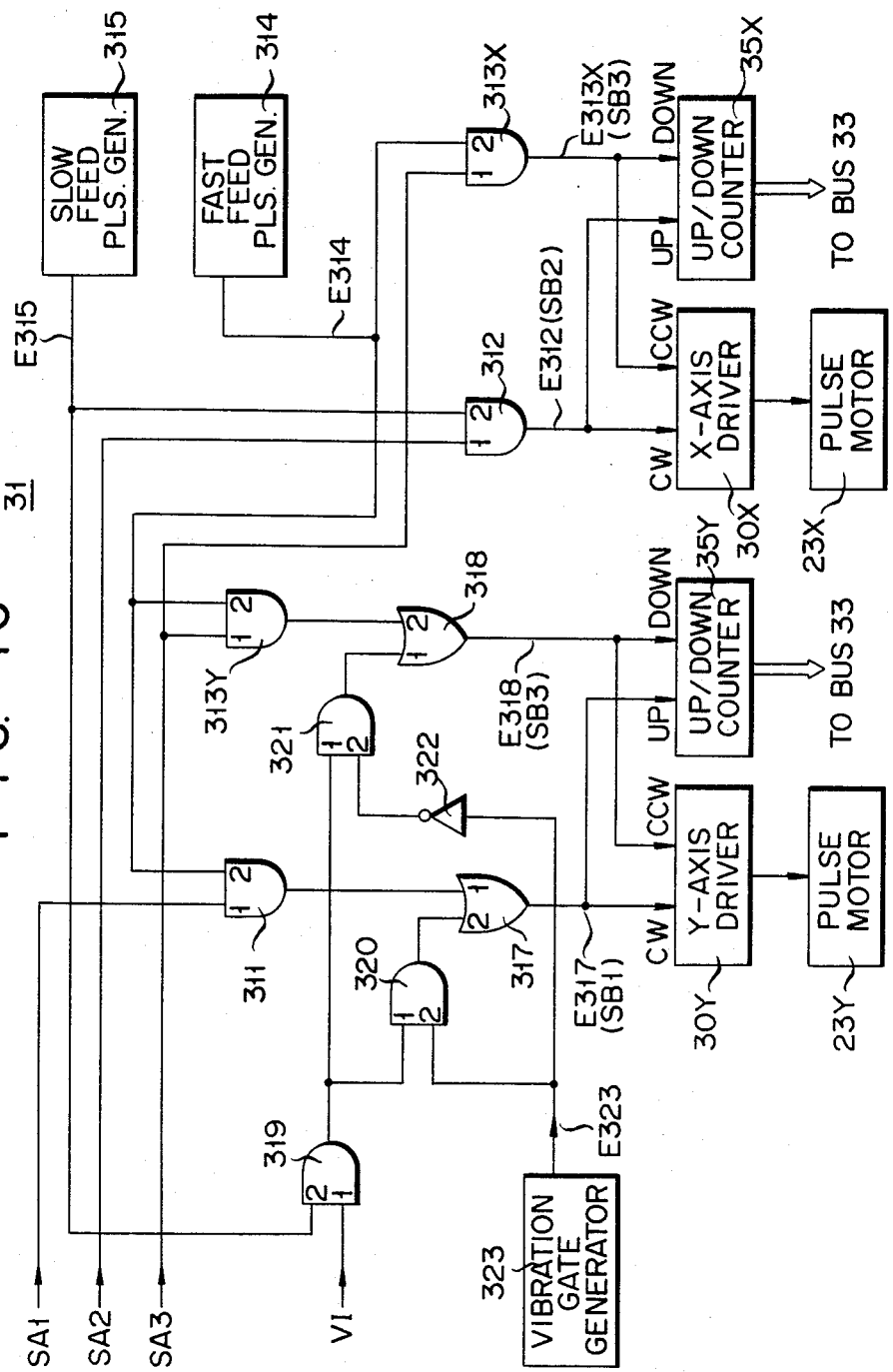
FIG. 4C shows another example of a circuit diagram of the pulse generator 31 shown in FIG. 4.

FIG. 4C shows another example of the pulse generator 31 for controlling movement along both the X- and Y-axes. The control signals SA1 and SA2 are respectively supplied to the first input terminals of the AND gates 311 and 312. The control signal SA3 is supplied to the first input terminals of AND gates 313Y and 313X, respectively. A fast feed pulse E314 from the fast feed pulse generator 314 is supplied to the second input terminals of the AND gates 311, 313Y and 313X. A slow feed pulse E315 from the slow feed pulse generator 315 is supplied to the second input terminal of the AND gate 312. An output E312 from the AND gate 312 is supplied to the CW rotation input terminal of the X-axis driver 30X and to the up-count input terminal of the X-axis up/down counter 35X, respectively. An output E313X from the AND gate 313X is supplied to the CCW rotation input terminal of the driver 30X and to the down-count input terminal of the counter 35X.

Outputs from the AND gates 311 and 313Y are supplied to the first input terminals of OR gates 317 and 318, respectively. An output from an AND gate 320 is supplied to the second input terminal of the OR gate 317, while an output from an AND gate 321 is supplied to the second input terminal of the OR gate 318. An output from an AND gate 319 is supplied to the first input terminals of the AND gates 320 and 321. A gate signal E323 from a vibration gate generator 323 is supplied to the second input terminal of the AND gate 320. The signal E323 is inverted by an inverter 322, and an inverted signal from the inverter 322 is supplied to the second input terminal of the AND gate 321. A vibration instruction VI from the CPU 34 is supplied to the first input terminal of an AND gate 319, and the slow feed pulse E315 is supplied to the second input terminal of the AND gate 319. An output E317 from the OR gate 317 is supplied to the CW rotation input terminal of a Y-axis driver 30Y of the driver 30 and to the up-count input terminal of a Y-axis up/down counter 35Y. An output E318 from the OR gate 318 is supplied to the CCW rotation input terminal of the driver 30Y and to the down-count input terminal of the counter 35Y.

When the control signals SA1 to SA3 have logic levels of "1", "0" and "0", the output E317 is supplied as the CW pulse SB1. In this case, the Y table 19 is fast fed. When the control signals SA1, SA2 and SA3 have logic levels of "0", "1" and "0", the output E312 is supplied as the CW pulse SB2. In this case, the X table 22 is slow fed. When the vibration instruction VI supplied from the CPU 34 to the AND gate 319 becomes logic level "1", the slow feed pulse E315 is supplied to either of the OR gates 317 and 318 in accordance with the level of the gate signal E323. When the gate signal E323 is at logic level "1", the AND gate 321 is closed while the AND gate 320 is opened. Therefore, the pulse E315 is supplied to the CW rotation input terminal of the driver 30Y through the gates 319, 320 and 317. Then, the Y table 19 is slow fed in the forward direction. When the gate signal E323 has logic level "0", the AND gate 320 is closed while the AND gate 321 is opened. Therefore, the pulse E315 is supplied to the CCW rotation input terminal of the driver 30Y through the gates 319, 321 and 318. Then, the Y table 19 is slowly returned. In other words, while the vibration instruction VI is kept at logic level "1", the Y table 19 is repeatedly slow fed in the forward or backward direction at a half period of the signal E323. This operation prevents nonuniform wear of the wheel 12 as in the case of the oscillation mechanism 17 shown in FIG. 2.

In general, the vibration instruction VI may be generated during a period from the time after the Y table 19 is fast fed in response to the control signal SA1 to the time before the X table 22 is returned quickly in response to the control signal SA3. Thus, the Y table 19 may be moved during the periods of slow forward movement of the X table 22 and the spark out period.

When the pulse generator 31 of the configuration as shown in FIG. 4C is used, fast forward movement of the X-Y table 18 is performed only in the Y-direction. Therefore, during fast feeding even if the X-Y table 18 is overfed due to its inertia, the periphery of the work W will not abut against the grinding surface of the wheel 12.

The mode of operation of the arrangement shown in FIGS. 2 to 4 will now be described with reference to FIGS. 5 to 7. In order to facilitate understanding of the operation, a case will be described wherein numerical control is performed only in the X-axis.

First, a test piece T equal in size to the target size of the work W is drawn by suction to the holding mechanism C having a vacuum suction device. The test piece T is made of an electric conductive material such as copper. Next, a signal E34 of logic level "0" from the CPU 34 is supplied to the touch sensor 28 shown in FIG. 4A so as to enable the sensor 28. Then, the CPU 34 supplies a control signal SA1 of logic level "1" to the pulse generator 31 shown in FIG. 4B. In response to the control signal SA1, the X-axis motor 23X is driven for fast feeding in the CW direction by the driver 30X so as to fast feed the X table 22 in the forward direction. Then, the bevel TB of the test piece T draws near to a grinding surface 12P of the wheel 12. When the bevel TB draws near to the grinding surface 12P, the CPU 34 switches the control signal SA1 to the control signal SA2. Then, the motor 23X is driven for slow feeding in the CW direction so as to slow feed the X table 22 in the forward direction. During this time, the position counter 35 up-counts in accordance with the forward movement of the X table 22. When the bevel TB of the test piece T touches the grinding surface 12P of the wheel 12, the input terminal 282 shown in FIG. 4A is short-circuited to the input terminal 281. At this moment, a touch signal E28 is generated. The signal E28 is supplied to the CPU 34. When the signal E28 is generated, the forward movement of the X table 22 is interrupted, and the content N1 of the counter 35 at this moment is stored in the RAM 38. The data N1 is the machining end position data of the work W.

When the data N1 is stored, the CPU 34 supplies a control signal SA3 of logic level "1" to the generator 31. Then, the driver 30X drives the motor 23X for fast CCW feeding so as to return the X table 22. The test piece T is then separated from the wheel 12 as indicated by arrow X2 in FIG. 5. During this time, the counter 35 down-counts in accordance with the return movement of the X table 22. In addition to the data N1, the RAM 38 also stores the total stroke data N2+N3. When the X table 22 returns to the point at which the content of the counter 35 reaches N1−N2−N3, the CPU 34 stops the return movement of the X table 22. The content N1−N2−N3 of the counter 35 at this moment becomes the machining start position data (origin position data).

The above-mentioned step is called a "set-up" step. In this step, the data N1−N2−N3 is determined for the test piece T (steps 40 and 41 in FIG. 7). The RAM 38 further stores the machining amount data N2. Using the data N1−N2−N3, N1−N2 and N1, the CPU 34 forms a bevel on the periphery of the work W.

Figure 6:
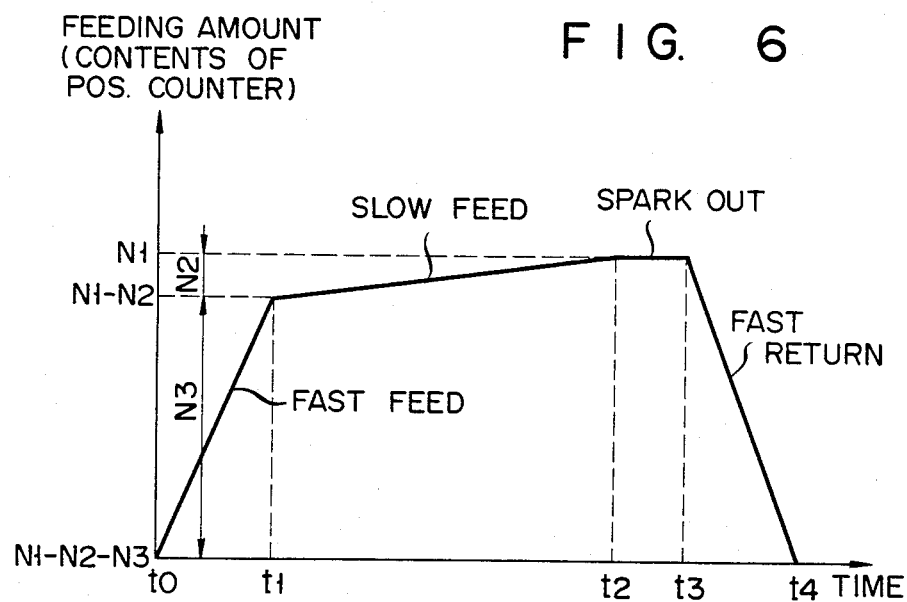
FIG. 6 is a graph showing the sequence for machining the periphery of a work according to the present invention.
Figure 7:
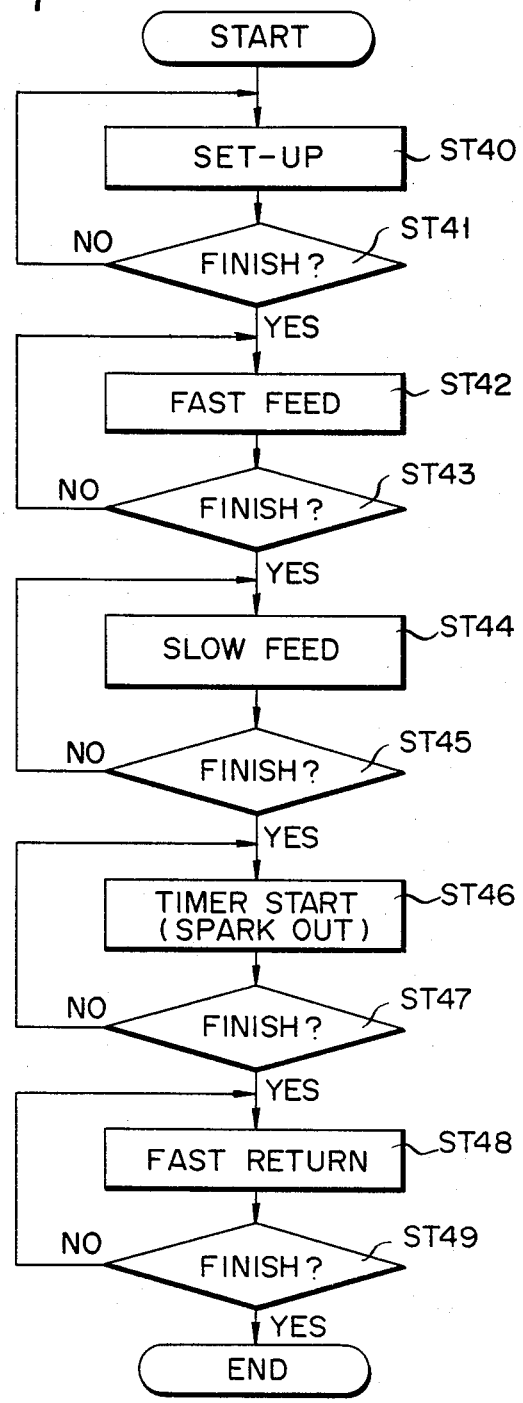
FIG. 7 is a general flow chart showing the sequence for machining the periphery of a work according to the present invention.

When the work W is drawn by suction on the holding mechanism C, the CPU 34 supplies a control signal SA1 for a time period in which the content of the counter 35 changes from N1−N2−N3 to N1−N2 (time t0 to t1 in FIG. 6). During this time period, the X table 22 is fast fed in the forward direction (step ST42 in FIG. 7). When the content of the counter 35 reaches N1−N2, the fast feeding of the X table 22 is terminated (step ST43). Since the data N2 represents the machining amount of the work W, the periphery of the work W comes just in front of the wheel 12. When the content of the counter 35 reaches N1−N2, the CPU 34 supplies a control signal SA2 to the genrator 31 until the count reaches N1 (time t1 to t2 in FIG. 6). During this time period, the X table 22 is slow fed in the forward direction (step ST44 in FIG. 7). When the content of the counter 35 reaches N1, slow feeding of the X table 22 is terminated (step ST45). The data N1 is data representing the position at which the bevel TB of the test piece T touches the grinding surface 12P of the wheel 12. When the forward movement of the X table 22 is interrupted at this point, the bevel of the work W will correspond to that of the test piece T.

Figure 9:
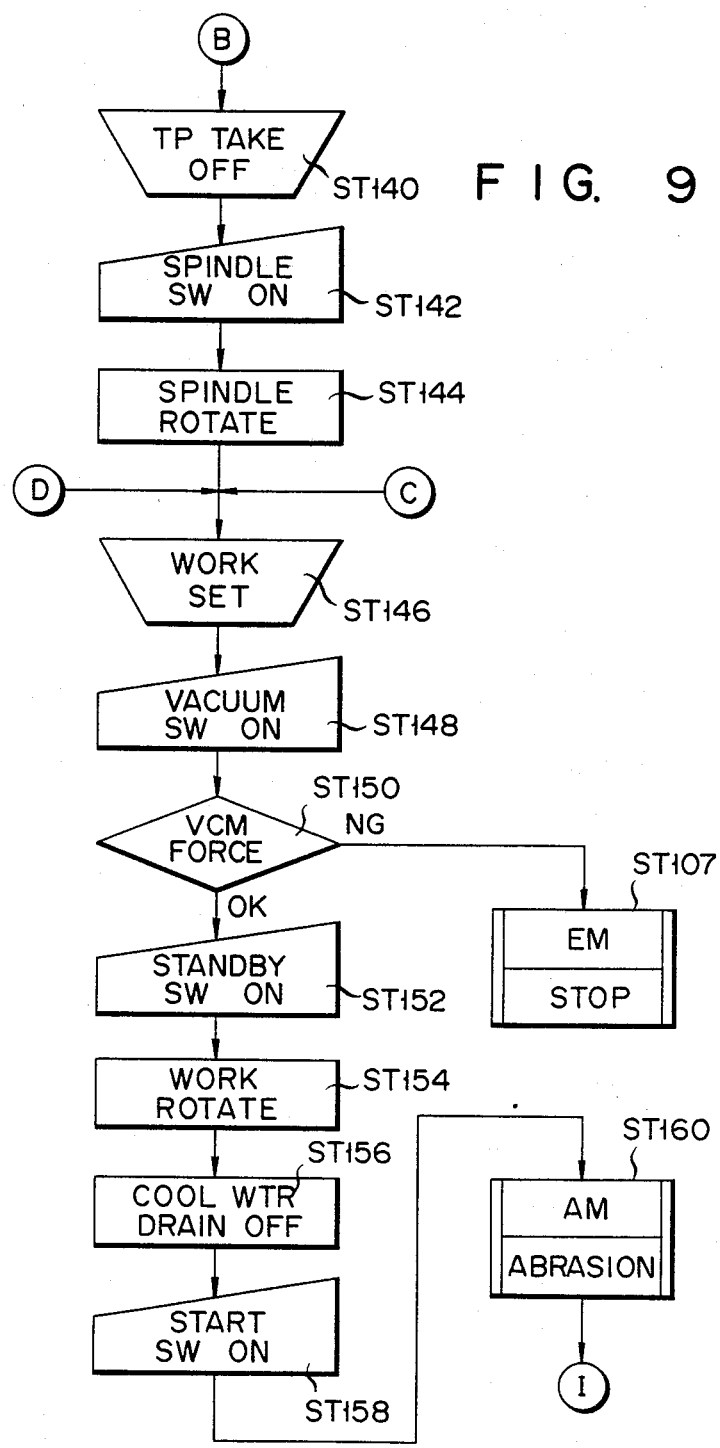

When the content of the counter 35 reaches N1, the CPU 34 triggers the timer 36 shown in FIG. 4. After being triggered, the timer 36 prohibits generation of the control signals SA1 to SA3 for a predetermined time period (time t2 to t3 in FIG. 6). During this time period, the work W is subjected to the spark out step by the wheel 12 (step ST46 in FIG. 7). When the timer 36 stops operating, the CPU 34 supplies a control signal SA3 to the generator 31 until the content of the counter 35 changes from N1 to N1−N2−N3 (time t3 to t4 in FIG. 6). During this time period, the X table 22 returns quickly (step ST48 in FIG. 7). When the content of the counter 35 reaches N1−N2−N3, fast feeding of the X table 22 is terminated (step ST49). In this manner, one cycle of machining for forming a bevel on the work W is completed. In order to repeat the same machining operation, steps ST42 to ST49 shown in FIG. 9 are repeated.

Similar numerical control to that described above with reference to numerical control in the X-axis direction may be performed for numerical control along both the X- and Y axes. The main difference is that fast feeding in the forward direction is performed by the Y table 19 and slow feeding in the forward direction is performed by the X table 22. In this case, the set-up is performed in the following manner. First, the test piece T is drawn by suction to the holding mechanism C. Next, the total stroke data N2+N3 and the machining amount data N2 are key-inputted by the input device 32a. When the data N2+N3 and N2 are given, the data N3 representing the fast forward distance can be calculated by (N2+N3)−N2. Then, the outer diameter data of the test piece T is key-inputted by the input device 32a. The outer diameter data is used for bringing the bevel TB of the test piece T to the central axis along the X-axis of the wheel 12 by moving the Y table 19. When the provisional origin position of the Y table 19, the inclined angle of the machining table 27, and the outer diameter of the test piece T are given, then the distance of forward travel of the Y table 19 for bringing the bevel TB to the central axis of the wheel 12 may be calculated. The forward travel distance of the Y table 19 corresponds to data N3. When the drawing by suction of the test piece T and the key input of the data N2+N3, N2 and the outer diameter data of the test piece T are completed, the "set-up" is performed in the following sequence (FIGS. 4C and 5).

(1) The X table 22 and the Y table 19 are rapidly returned to the provisional origin positions in response to the control signal SA3.

(2) The Y table 19 is fast fed in the forward direction (arrow Y1 in FIG. 5) in response to the control signal SA1 until the bevel TB of the test piece T is on the central axis of the wheel 12.

(3) The X table 22 is slow fed in the forward direction (arrow X1 in FIG. 5) in response to the control signal SA2 so that the bevel TB comes close to the grinding surface 12P of the wheel 12.

(4) The content N1X of the X-axis counter 35X and the content N1Y of the Y-axis counter 35Y are stored in the RAM 38, the contents N1X and N1Y corresponding to those when the bevel TB touches the grinding surface 12P.

(5) The X table 22 is rapidly returned (arrow X2 in FIG. 5) from the position corresponding to the data N1X to the position corresponding to the data N1X-N2 in response to the control signal SA3. This position corresponds to the X-axis origin position.

(6) The Y table 19 is rapidly returned (arrow Y2 in FIG. 5) from the position corresponding to the data N1Y to the position corresponding to the data N1Y-N3 in response to the control signal SA3. This position is the Y-axis origin position.

In the above sequence, the sum of the travel distance (N2) of the X table 22 and the travel distance (N3) of the Y table 19 corresponds to the total stroke data N2+N3.

A set-up is performed in the following manner in a case where forward/backward movement in the X-axis direction is mainly controlled numerically and movement in the Y-axis direction is performed merely by driving with a motor in place of manual control. First, the test piece T is held by suction on the holding mechanism C. Subsequently, the total stroke data N2+N3, the machining amount data N2 and the outer diameter data of the test piece T are key-inputted. Then, the set-up is performed in the following sequence (FIGS. 4B and 5).

(1) The X table 22 is rapidly returned to the provisional origin position, and the Y table 19 is also rapidly returned to the origin position.

(2) The Y table 19 is fast fed in the forward direction (arrow Y1 in FIG. 5) until the bevel TB of the test piece T is on the central axis of the wheel 12. The distance of this forward movement is adjusted in accordance with the outer diameter data of the test piece T.

(3) The X table 22 is fast fed in the forward direction in response to the control signal SA1. When the bevel TB draws near to the grinding surface 12P of the wheel 12, the X table 22 is slow fed in the forward direction (arrow X1 in FIG. 5) in response to the control signal SA2.

(4) The content N1 of the X-axis counter 35X when the bevel TB touches the grinding surface 12P is stored in the RAM 38.

(5) The X table 22 is rapidly returned (arrow X2 in FIG. 5) for a distance corresponding to the total stroke data N2+N3 in response to the control signal SA3. The X table 22 is stopped at the position (origin or zero point of X-axis) corresponding to the data N1−N2−N3.

(6) The Y table 19 is rapidly returned (arrow Y2 in FIG. 5) to the origin position of Y-axis.

Although three types of set-up step have been described above, the basic sequence remains the same. When a nonmachined work W is held on the holding mechanism C in place of the test piece T, the work W is fast fed from the origin position (N1−N2−N3) determined by the set-up to the machining start position (N1−N2). Subsequently, the work W is slow fed from the machining start position (N1−N2) to the machining end position (N1) and stops there. The work W is then rapidly returned to the origin position (N1−N2−N3). The sequence of forward and backward movement of the work W becomes the same as that of the test piece T during the set-up except for the correction operation of the origin position. Therefore, the target size of the bevel of the work W constantly becomes the same as the size of the standard bevel TB of the test piece T.

The Y table 19 may be fast fed in the forward or backward direction by rotating the machining table 27, in place of parallel moving the Y table 19. In this case, the pulse motor 23Y shown in FIG. 2 is coupled to the rotating shaft of the table 27 through a gear device or the like.

Figure 8:
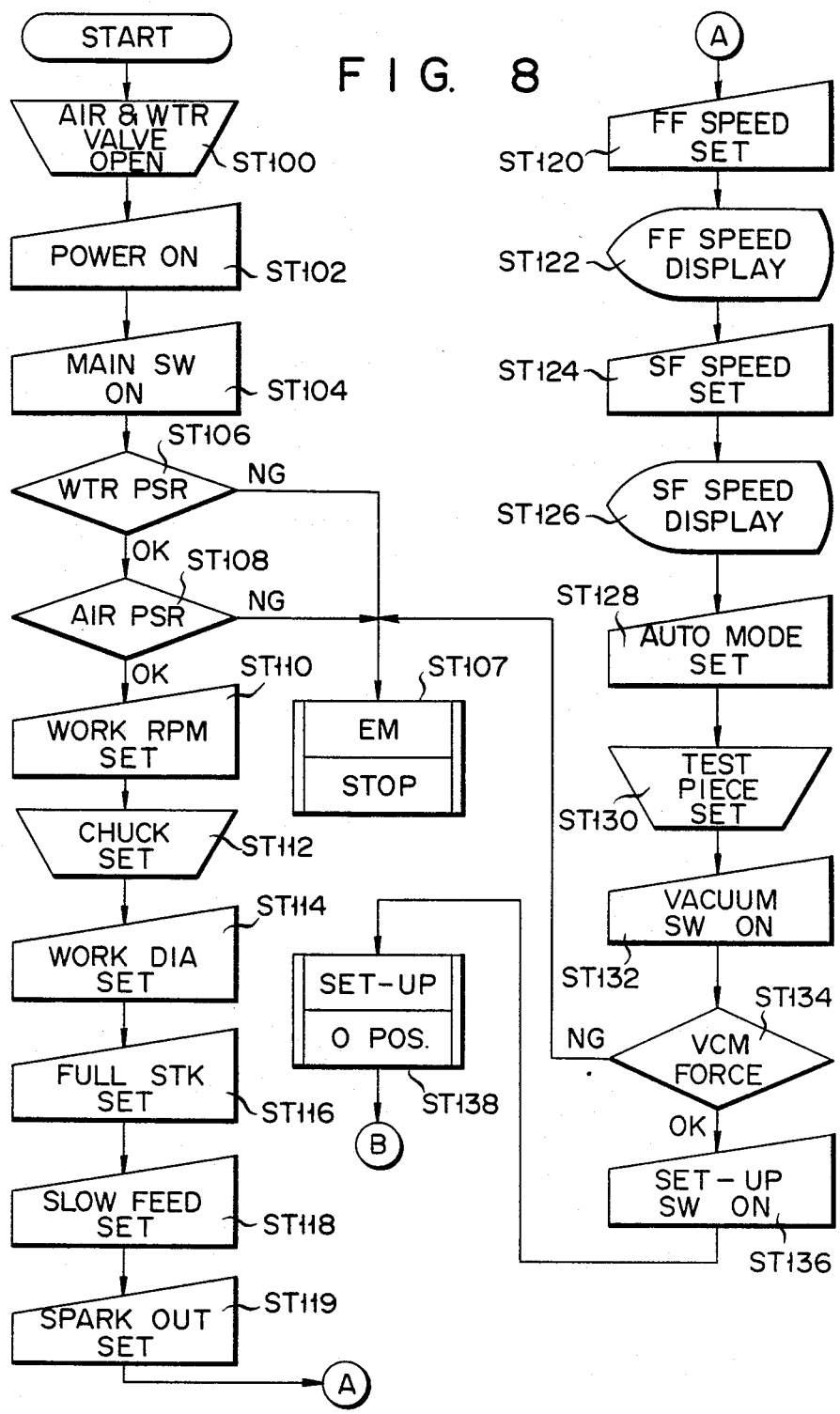
FIGS. 8 to 10 are detailed flow charts showing the sequence of machining the periphery of a work according to the present invention.
Figure 10:
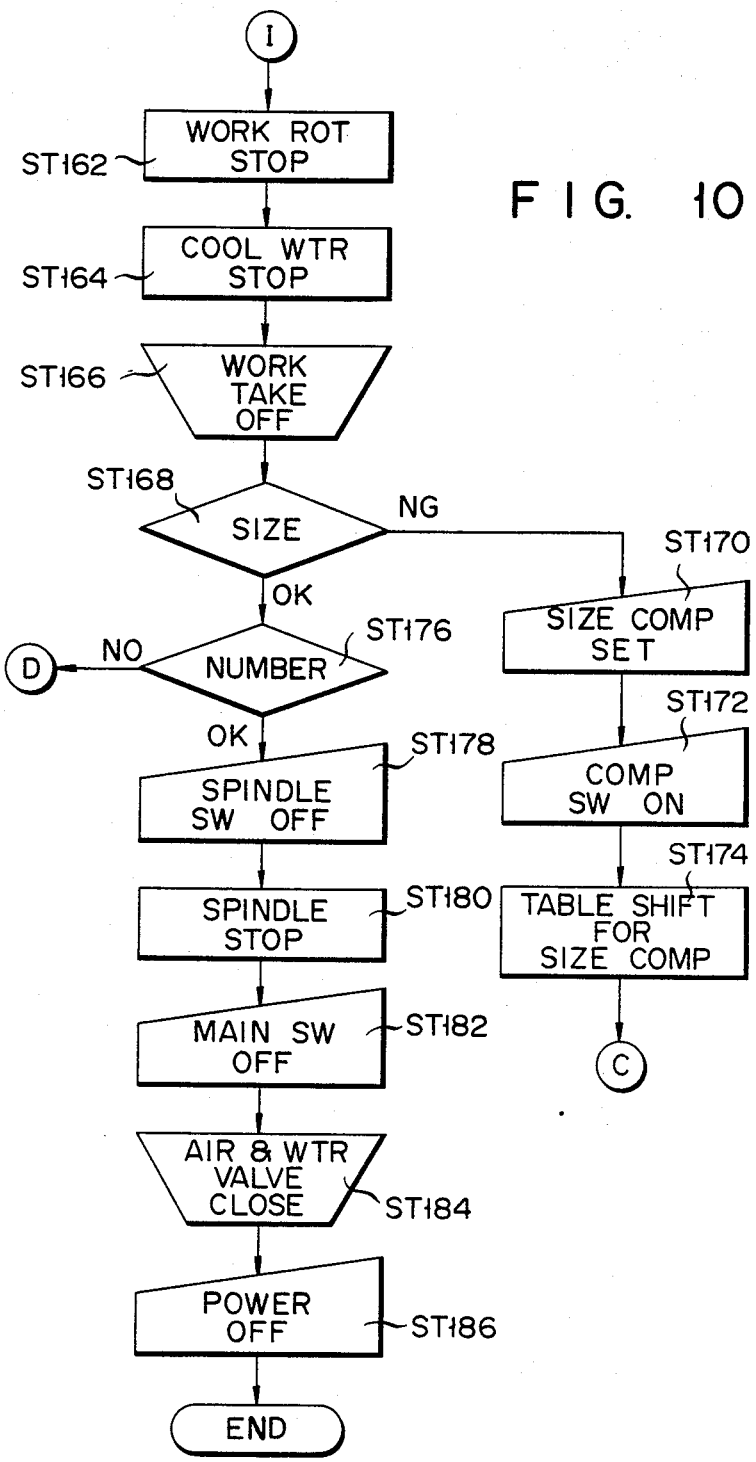

An example of the details of the general flow chart shown in FIG. 7 will now be described. FIGS. 8 to 10 are detailed flow charts showing the sequence of machining the periphery of a work according to the present invention including a manual operation.

First, the air valve 40 and water valve 42 shown in FIG. 4 are opened (ST100; FIG. 8). The power source of the apparatus is turned on (ST102), and the main switch (not shown) of the sequence controller is turned on (ST104). It is then determined whether or not the water pressure of the water valve 42 is normal (ST106). If the water pressure is not normal (NG), the flow goes to the step of an emergency (EM) subroutine (ST107). The contents of the subroutine in step ST107 will be described later with reference to FIG. 13. If the water pressure is normal (OK), the air pressure of the air valve 40 is checked (ST108). If the air pressure is not normal (NG), the flow goes to the step of the EM subroutine (ST107). If the air pressure is normal (OK), the r.p.m. of the work is set (ST110). A chuck having a standard corresponding to the outer diameter of the work W is mounted on the spindle 24 of FIG. 2 (ST112). Then, the outer diameter of the work W is set (ST114), the total or full stroke data (N2+N3) of the work W is set (ST116), the slow feed stroke data N2 of the work W is set (ST118), and the data determining the spark out time is set (ST119). The data being set in steps ST114 to ST119 are stored in the RAM 38 shown in FIG. 4.

The fast feeding speed is then set (ST120), and displayed by a display device such as an LED (ST122). Subsequently, the slow feeding speed is set (ST124), and similarly displayed (ST126). Then an automatic mode (AM mode) is set (ST128). If the controller shown in FIG. 4 is designed for the AM mode only, this step ST128 may be omitted. A test piece T is set on a holding mechanism C (ST130), the switch of a vacuum pump is turned on (ST132), and the vacuum suction force is checked (ST134). If this suction force is too low (NG), the flow returns to the step of the EM subroutine (ST107). If the suction force is high enough (OK), the set-up switch is turned on (ST136). The origin position of the work is determined in the step of a set-up subroutine (ST138). The contents of the set-up subroutine in step ST138 will be described with reference to FIG. 11. Incidentally, in step ST130, if the spindle switch (to be described later) is ON, it is turned off.

When the origin position of the work W is determined, the test piece T is removed from the chuck (ST140 of FIG. 9), the power source (not shown) of the spindle motor 26 is turned on (ST142), and the spindle 24 is rotated (ST144). Then, in place of the test piece T the work W is set on the chuck (ST146), the switch of the vacuum pump is turned on (ST148), and the vacuum suction force is checked (ST150). When the vacuum suction force is too low (NG), the flow returns to the step of the EM subroutine (ST107). If the vacuum suction force is high enough, the standby switch is turned on (ST152). Then, the work W is rotated (ST154) and cooling water is sprayed on the wheel 12 (ST156). When the start switch (not shown) is turned on (ST158), an identical bevel to that formed on the test piece T is formed on the periphery of the work W in the step of an AM mode subroutine (ST160). The contents of the AM mode subroutine in step ST160 will be described later with reference to FIG. 12.

After the bevel is formed on the work W, the rotation of the work W is stopped (ST162; FIG. 10). Then, the spraying of cooling water is stopped (ST164), and the work W with the machined bevel is removed from the chuck (ST166). The finished size of the work W is then checked (ST168). If the finished size of the work W deviates from the target size (NG), the origin position on the X-axis (corresponding to the data N1−N2−N3) is corrected (ST170). The compensation switch (not shown) for commanding a correction or compensation amount ±N4 to the CPU 34 is turned on (ST172). The machining table 27 or the X table 22 is shifted for a distance corresponding to the compensation amount ±N4 (ST174). After this table shift, although the total or full stroke data N2+N3 is not changed, but the origin position data N1−N2−N3 is changed by ±N4. As a result, the machining end position data N1 is changed by ±N4, and the grinding amount of the periphery of the work W is also changed by ±N4. Therefore, the finished size of the bevel of the work W is corrected in accordance with the compensation amount ±N4. After this correction, the flow returns to step ST146 in FIG. 9.

If the finished size of the work W is within an allowable range (OK in ST168 of FIG. 10), the number of works W which have been machined is checked (ST176). If a predetermined number of works has not yet been machined (NO), the flow returns to step ST146 in FIG. 9. On the other hand, if the predetermined number of works has been machined (OK), the spindle switch is turned off (ST178), the rotation of the spindle 24 is stopped (ST180), and the main switch is turned off (ST182). Then, the air valve 40 and the water valve 42 are closed (ST184), and the power source of the apparatus is turned off (ST186).

In the flow described above, the sequence of the set-up subroutine in step ST138 and that of the AM mode subroutine in step ST160 are the most important features of the method for machining the periphery of a work according to the present invention.

Figure 11:
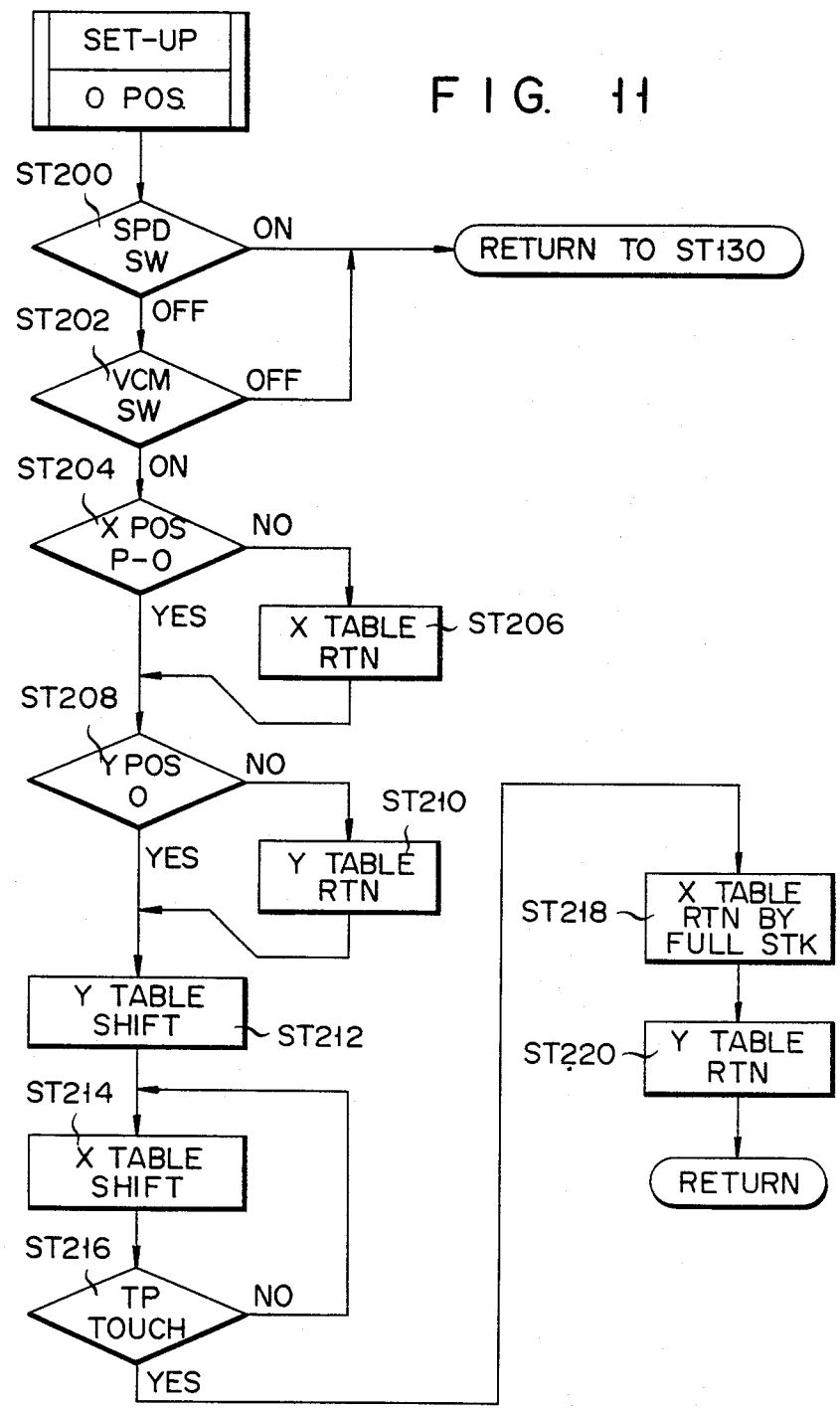
FIG. 11 is a flow chart showing the contents of a subroutine of the set-up step shown in FIG. 8.

FIG. 11 shows the set-up subroutine in step ST138. When the set-up switch is turned on in step ST136 in FIG. 8, the ON/OFF state of the spindle switch is checked (ST200). When the spindle switch is ON, the flow returns to step ST130, and the spindle switch is turned off. When the spindle switch is off, the ON/OFF of the vacuum pump switch is checked (ST202). If this switch is OFF, the flow returns to step ST130. If the switch is ON, the position of the X table 22 is checked (ST204). If the X table 22 is not at the provisional origin position (NO), it is returned to the provisional origin position (ST206). If it is at the provisional origin position (YES), the position of the Y table 19 is then checked (ST208). If the Y table 19 is not at the provisional origin position (NO), it is returned to the origin position (ST210). If it is at the provisional origin position (YES), it is shifted in the forward direction for a predetermined distance, so that the bevel TB of the test piece T is aligned on the central axis of the wheel 12 (ST212). Since the distance of the feed in the forward direction of the Y table 19 is a known value in accordance with the rotational angle of the machining table 27 with respect to the X-Y table 18, the Y-axis origin point and the work outer diameter data (step ST114 in FIG. 8), a step for checking the position after its forward movement is omitted here.

Subsequently, the X table 22 is shifted in the forward direction (ST214). Then, whether or not the bevel TB of the test piece T moving together with the X table 22 has touched the grinding surface 12P of the wheel 12, is checked (ST216). This checking is performed by the touch sensor 28 as shown in FIG. 4A. If the test piece T has not touched the wheel 12 (NO), the flow returns to step ST214 and the forward movement of the X table 22 is continued. When the test piece T touches the wheel 12 (YES), the machining end position data N1 is stored in the RAM 38. Subsequently, the X table 22 is returned for a distance corresponding to the total or full stroke data N2+N3 (ST218). Note that the total stroke data is set in step ST116 in FIG. 8. Then, the X table 22 comes to the normal origin or zero position (corresponding to the data N1−N2−N3). The Y table 19 is returned to the origin position (ST220) and the flow returns to step ST140 in FIG. 9.

Figure 12:
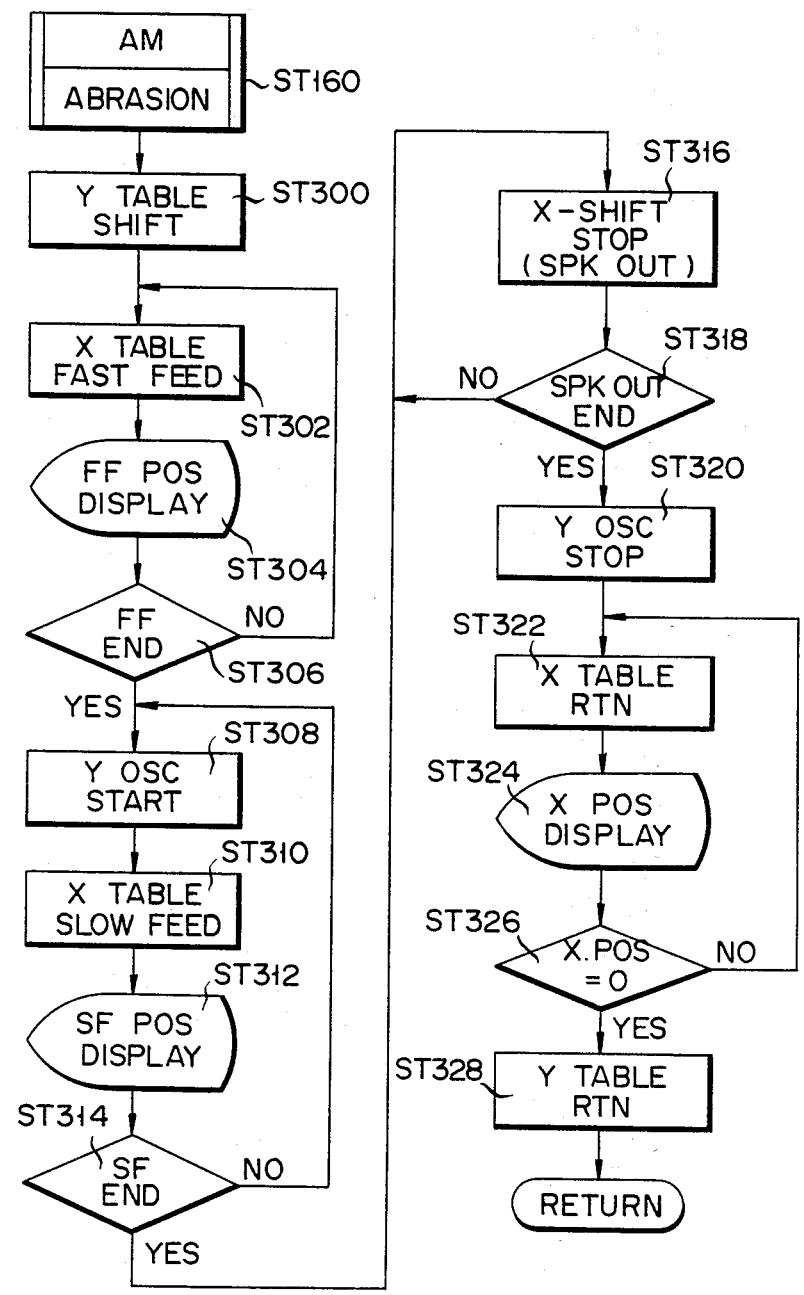
FIG. 12 is a flow chart showing the contents of a subroutine of the AM (automatic machining mode) step shown in FIG. 9.

FIG. 12 shows the AM mode subroutine in step ST160. When the start switch is turned on in step ST158, the Y table 19 moves from the origin position to the central axis of the wheel 12 (ST300). Then, fast feeding of the X table 22 in the forward direction is started (ST302), and the change in the position of the X table 22 upon fast feeding is displayed (ST304). It is then checked whether or not the X table 22 has traveled for a distance corresponding to the data N3 which represents the difference between the total or full stroke data N2+N3 and the slow feed data N2 (ST306). This is done by checking whether or not the content of the position counter 35 in FIG. 4 has become equal to N1−N2. If the X table 22 has not traveled this distance, fast feeding of the X table 22 in the forward direction is continued. When the X table 22 has traveled this distance (YES), the Y table 19 is reciprocated or oscillated (ST308). Subsequently, the X table 22 is slow fed in the forward direction (ST310), and the change in the position of the X table 22 in the forward direction is displayed (ST312). Then, whether or not the X table 22 has completed its forward movement corresponding to the data N2 (ST314) is checked. This checking is performed by checking if the content of the position counter 35 has reached N1. If the X table 22 has not moved for a distance corresponding to the data N2 (NO), the flow returns to step ST308, and slow feeding of the X table 22 continues. When the X table 22 has moved this distance (YES), the forward movement of the X table 22 is stopped. At this time, the X table 22 has completed its forward movement from the origin position (corresponding to the data N1−N2−N3) for a distance corresponding to the total stroke data N2+N3, and has come to the machining end position corresponding to the data N1.

The spark out is performed (ST316) for a time period determined in step ST119 in FIG. 8. The spark out time period is controlled by the timer 36 shown in FIG. 4. If the timer 36 has not reached the time up point (NO in ST318), the spark out of step ST316 is continued. If the timer 36 has reached the time up point (YES), the reciprocation or oscillation of the Y table 19 is stopped (ST320). Next, the X table 22 returns to the origin position corresponding to the data N1−N2−N3 (ST322). The change in the position of the X table 22 by this return movement is displayed (ST324). It is then checked to see whether the X table 22 has reached the normal X-axis origin position (zero position) (ST326). This checking is performed by checking whether or not the content of the position counter 35 shown in FIG. 4 has reached N1−N2−N3. If NO, the return movement in step ST322 is continued, but if YES, the Y table 19 is returned to the Y-axis origin position (ST328). The flow then returns to step ST162 in FIG. 10.

Figure 13:
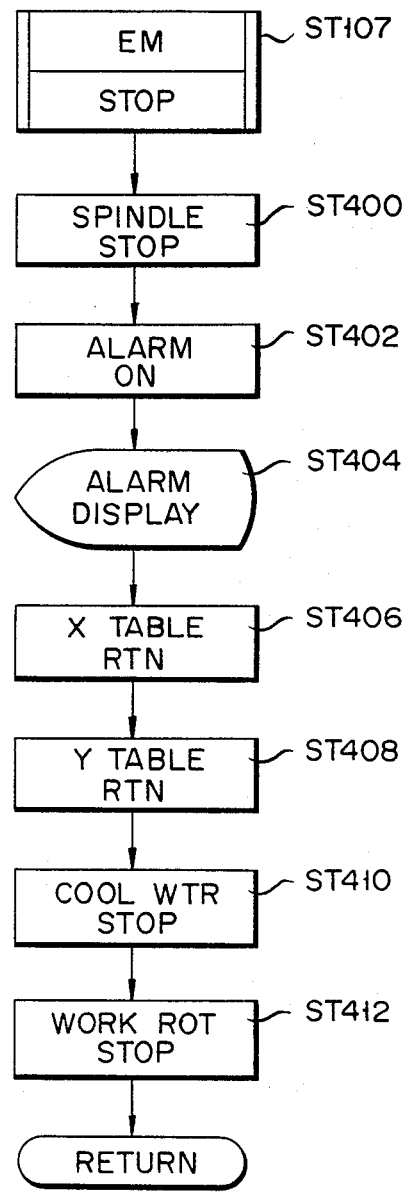
FIG. 13 is a flow chart showing the contents of a subroutine of the EM (emergency mode) step shown in FIGS. 8 and 9.

FIG. 13 shows the EM subroutine of step ST107. If NG is obtained in step ST106, ST108 or ST134 in FIG. 8, or in step ST150 in FIG. 9, the spindle 24 is stopped (ST400). An alarm sound representing the EM (emergency) is generated (ST402), and an alarm display is performed (ST404). The X table 22 is then returned to the origin position (ST406), and the Y table 19 is returned to the origin position (ST408). The spraying of cooling water is stopped (ST410), the rotation of the work W is stopped, and the flow returns to step ST100.

The present invention is not limited to the particular embodiments described above. For example, the X table and/or Y table may be driven by servo motors in place of pulse motors. In this case, the movement of the X table and/or Y table is measured with a rotary encoder. An output from the rotary encoder is up/down counted, and the rotational speed is controlled in accordance with the count output. Furthermore, the grinding wheel 12 may be mounted on the side of the machining table 27, and the holding mechanism C may be mounted on the side of the machining table 7. In this case, the wheel 12 moves in place of the work W to perform bevel machining in accordance with the present invention.

What we claim is:

1. An apparatus for machining the periphery of an electrically nonconductive workpiece, comprising:
   a grinding wheel with an electrically conductive grinding surface,
   means for holding either said workpiece or, an electrically conductive test piece having a predetermined bevel,
   moving means for changing the relative distance between said holding means and said wheel,
   touch sensor means for generating a touch signal when the bevel of said test piece held by said holding means electrically contacts the grinding surface of said wheel, and
   control means coupled to said touch sensor means and to said moving means, for detecting, when said touch signal is generated, machining end position data (N1) corresponding to the relative distance between said holding means and said wheel, and for actuating, when said workpiece is held by said holding means, said moving means according to said machining end position data (N1), so that machining of the periphery of said workpiece is effected.

2. The apparatus of claim 1, wherein said control means includes:
   a memory for storing predetermined machining amount data (N2) and predetermined feeding amount data (N3) which are defined in accordance with the size of said test piece; and
   computer means for generating a command signal which determines the relative distance between said holding means and said wheel in accordance with said machining end position data (N1), said machining amount data (N2) and said feeding amount data (N3), said command signal being used for actuating said moving means.

3. The apparatus of claim 2, wherein said moving means includes actuator means for changing the relative distance between said holding means and said wheel in accordance with the command signal from said computer means.

4. The apparatus of claims 3, wherein said holding means is moved by said actuator means so that the periphery of said workpiece is ground by said wheel.

5. The apparatus of claim 1, wherein said workpiece is a silicon wafer.

6. The apparatus of claim 5, wherein said workpiece includes a thyristor.

7. The apparatus of claim 2, wherein:
   the relative distance between said holding means and said wheel is changed by forward/backward movement of said holding means;
   the relative distance between said holding means and said wheel when said workpiece is mounted on said holding means is determined in accordance with total stroke data (N2+N3) which is a sum of said machining amount data (N2) and said feed amount data (N3), with reference to said machining end position data (N1);
   the relative distance between said holding means and said wheel when the periphery of said workpiece is moved in a forward direction to a position immediately in front of said grinding surface of said wheel is determined in accordance with said feeding amount data (N3) with reference to said total stroke data (N2+N3); and
   the relative distance between said holding means and said wheel when said workpiece is ground by said grinding surface of said wheel is determined in accordance with said machining amount data (N2).

8. The apparatus of claim 4, wherein:
   said moving means includes a movable table on which said holding means is placed, said movable table being movable in a first direction and in a second direction which is different from said first direction; and
   said actuator means comprises a first actuator for moving said movable table in said first direction and a second actuator for moving said movable table in said second direction.

9. The apparatus of claim 8, wherein:
   said first actuator moves said movable table in said first direction for a distance corresponding to said machining amount data (N2);
   said second actuator moves said table in said second direction for a distance corresponding to said feeding amount data (N3); and
   said first and second directions are orthogonal.

10. The apparatus of claim 8, wherein said first actuator moves said movable table in said first direction for a distance corresponding to said machining amount data (N2) and said feeding amount data (N3).

11. The apparatus of claim 8, wherein:
    said holding means has first motor means for rotating said workpeice; and
    said wheel has second motor means for rotating said wheel.

12. The apparatus of claim 8, wherein said wheel has means for reciprocating said wheel in said second direction.

13. The apparatus of claim 8, wherein said second actuator has means for reciprocating said movable table in said second direction when the periphery of said workpiece is ground by said wheel.

* * * * *